United States Patent
Dobbin (10) Patent No.: US 10,240,628 B2
(45) Date of Patent: *Mar. 26, 2019

(54) CAP WITH CHANNELS FOR FORMING A SEALED CAVITY AROUND FASTENER

(71) Applicant: AIRBUS OPERATIONS LIMITED, Bristol (GB)

(72) Inventor: Richard Dobbin, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 108 days.

This patent is subject to a terminal disclaimer.

(21) Appl. No.: 15/423,111

(22) Filed: Feb. 2, 2017

(65) Prior Publication Data
US 2017/0146048 A1    May 25, 2017

Related U.S. Application Data

(63) Continuation of application No. 14/440,714, filed as application No. PCT/GB2013/052868 on Nov. 1, 2013, now Pat. No. 9,599,141.

(30) Foreign Application Priority Data

Nov. 6, 2012   (GB) .................................. 1220002.8

(51) Int. Cl.
   *F16B 37/14*   (2006.01)
   *B64D 45/02*   (2006.01)
(52) U.S. Cl.
   CPC .............. *F16B 37/14* (2013.01); *B64D 45/02* (2013.01)
(58) Field of Classification Search
   CPC ......... F16B 37/14; F16B 37/145; B64D 45/02

USPC ....................................................... 411/372.5
See application file for complete search history.

(56) References Cited

U.S. PATENT DOCUMENTS

| | | |
|---|---|---|
| 4,826,380 A | 5/1989 | Henry |
| 4,884,933 A | 12/1989 | Preusker et al. |
| 4,905,931 A | 3/1990 | Covey |
| 5,082,409 A | 1/1992 | Bias |
| 5,810,532 A | 9/1998 | Huang |
| 6,318,942 B1 | 11/2001 | Wieczorek |
| 6,398,471 B1 | 6/2002 | Fischer |
| 7,384,225 B2 | 6/2008 | Woolstencroft |
| 8,366,367 B2 | 2/2013 | Matlock et al. |
| 8,388,293 B2 | 3/2013 | Hutter, III |
| 2002/0192052 A1 | 12/2002 | Ruspa |

(Continued)

FOREIGN PATENT DOCUMENTS

WO    2012/107741 A1    8/2012

OTHER PUBLICATIONS

International Search Report and Written Opinion dated May 27, 2014 in PCT/GB2013/052868.

*Primary Examiner* — Roberta S Delisle
(74) *Attorney, Agent, or Firm* — Nixon & Vanderhye P.C.

(57) ABSTRACT

A cap for forming a sealed cavity around one end of a fastener, the cap having a two-piece construction comprising an outer cap member and an inner cap member. A quantity of sealant is provided between the inner and outer cap members which, upon installation of the cap, is urged to flow between the inner and outer cap members and collect at the base of the outer cap member, to form a bead of sealant around the circumference of the cap, sufficient to adhere the cap to the structure when the sealant cures. A plurality of channels are provided between the inner and outer cap members to facilitate the flow of sealant.

20 Claims, 4 Drawing Sheets

(56) References Cited

U.S. PATENT DOCUMENTS

2005/0100425 A1   5/2005  Wu
2012/0074257 A1   3/2012  Bessho et al.
2012/0219380 A1   8/2012  Hutter, III
2013/0322982 A1  12/2013  Dobbin

Figure 3
section A-A

CAP WITH CHANNELS FOR FORMING A SEALED CAVITY AROUND FASTENER

CROSS-REFERENCE TO RELATED APPLICATIONS

This present application is a Continuation of U.S. patent application Ser. No. 14/440,714, filed. May 5, 2015, which is a National Phase of International Application Number PCT/GB2013/052868, filed Nov. 1, 2013, and claims priority to Great Britain Application Number 1220002.8, filed Nov. 6, 2012, the disclosures of which are hereby incorporated by reference herein in their entirety.

FIELD OF THE INVENTION

The present invention relates to a cap for forming a sealed cavity around one end of a fastener and a method of installing such a cap.

BACKGROUND OF THE INVENTION

Figure 1:
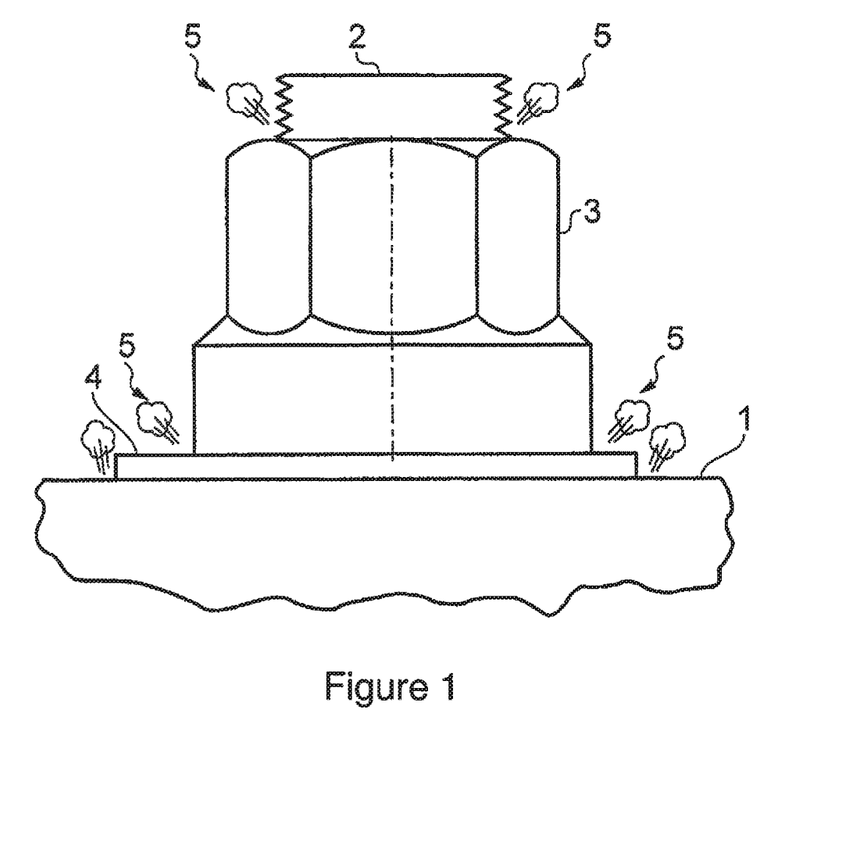
FIG. 1 is a side view of a nut and bolt assembly.

FIG. 1 is a side view of part of a fastener assembly passing through a composite panel 1. The assembly comprises an externally threaded bolt 2, an internally threaded nut 3, and a washer 4. In the event of a lightning strike hitting the composite panel 1 and attaching to the fastener, sparking, plasma or out-gassing may occur at the locations 5 shown in FIG. 1.

A known method of providing spark suppression is described in WO 2012/107741. A volume of gas is enclosed by a cap around the fastener. The gas provides spark suppression for arcing that may occur between the composite structure and the metal fastener during any lightning strike.

WO 2012/107741 describes a two-piece construction comprising an outer cap member and an inner cap member. In one example the required quantity of sealant is measured into the base of the outer cap member and the inner cap member is then either partially nested within the outer cap and placed over one end of the fastener. By exerting hand pressure to urge the outer cap over the inner cap, towards the structure, the sealant is forced to flow between the inner and outer caps and exit from around the base of the outer cap over the surface of the structure.

Ideally, the sealant is distributed without voids between the inner and outer cap members, and a portion of sealant collects at the base of the outer cap member, to form a bead of sealant around the circumference of the cap, sufficient to adhere the cap to the structure when the sealant cures.

The installation force increases approximately proportional to the cross sectional area and surface area of the space between the inner and outer caps and there is no mechanical advantage. On larger installations, e.g. fasteners larger than approximately ¾ diameter, an unreasonably high installation force is required to install the nut cap by hand.

SUMMARY OF THE INVENTION

A first aspect of the invention provides a cap for forming a sealed cavity around one end of a fastener, the cap comprising an inner cap member with a base terminating at an edge which surrounds an opening into a central cavity; an outer cap member which fits over the inner cap member and has a base; and a sealant material between the inner cap member and the outer cap member, wherein either: the inner cap member has side walls with a substantially uniform wall thickness and a plurality of channels formed in an outer surface of the inner cap member and a plurality of corresponding ridges formed in an inner surface of the inner cap member, the channels and the ridges extending longitudinally along a substantial portion of the inner cap member; or the outer cap member has side walls with a substantially uniform wall thickness and a plurality of channels formed in an inner surface of the outer cap member and a corresponding plurality of ridges formed in an outer surface of the outer cap member, the channels and the ridges extending longitudinally along a substantial portion of the outer cap member.

The plurality of channels form a path along which the sealant may flow more freely as compared to the nominal gap provided between the side walls of the inner and outer cap members. This is due to the reduced effect of friction of the sealant with the walls, thanks to the reduced sealant to wall contact for a given cross-sectional area of sealant flow. The invention is therefore particularly advantageous when applied to caps for larger diameter fasteners, e.g. fasteners larger than approximately ¾ diameter, which may otherwise not be suitable for hand installation, but enables a reduced installation force for all fastener diameters.

The size of the channels can be varied to control the amount of force required to install the nut cap.

The channel depth may diminish towards the top of the cap. This further facilitates the motion of the sealant from the top of the cap to the base by providing a graduated channel and therefore decreases the installation force. It also reduces the amount of sealant held near the top of the cap, where it is desirable to have only a thin film to ensure good adhesion of the entire surface of the outer surface of the inner cap member to the inner surface of the outer cap member.

The channel width may flare outwardly towards the base. The flares may join to form a substantially annular aperture between the inner and outer cap members adjacent their respective bases. This arrangement further supports sealant flow and even distribution of sealant at the bond line with the structure.

The plurality of longitudinal channels may emanate from a common point at the top of the cap. This encourages equal flow of sealant at all points around the circumference of the cap so reducing or eliminating voids formation in the sealant.

The cap may have at least three locating features disposed around the inner surface of the inner cap member. These locating features ensure an interference fit of the inner cap with the one end of the fastener.

In a preferred embodiment the channels and corresponding ridges are on the inner cap member and the locating feature is the ridge on the inner surface of the inner cap member. This arrangement produces a point contact with the fastener and does not restrict out-gassing into the inner cavity.

In a preferred embodiment the inner cap member has the channels and ridges, and a cross-section of the side walls of the outer cap member when viewed longitudinally, is annular.

In a preferred embodiment the cross-section of the side walls of the inner cap member when viewed longitudinally, is a repeating pattern of channels and ridges around the circumference of the inner cap member. The adjacent ones of the channels may meet forming a cusp. In another preferred embodiment the adjacent ones of the channels may meet forming a crest between the channels, i.e. the channels meet without an abrupt change in curvature of the side wall.

In yet another preferred embodiment the channels may be circumferentially interspersed between regions where the inner and outer surfaces have constant diameter. The specific arrangements chosen will be a function of many factors, including for example fastener size, required adhesion properties and viscosity of uncured sealant. Whilst a repeating pattern of similar channels will often be preferred, an arrangement of dissimilar channels and/or dissimilar spacing between adjacent channels may be appropriate for some installations.

The cross section of the channel when viewed in the longitudinal direction is substantially scallop shaped. The scalloped shape of the inner cap permits some radial stretching which enables an interference fit to be maintained over the tolerance range of the fastener base.

The base of the outer cap member may form a flange extending outwardly from the inner cap member at a point which is set back from the edge of the base of the inner cap member so as to define a pocket between the flange and the base of the inner cap member. This arrangement provides a greater surface for the bead to adhere to the structure.

A further aspect of the invention provides a cap for forming a sealed cavity around one end of a fastener, the cap comprising an inner cap member; an outer cap member which fits over the inner cap member; and a sealant material between the inner cap member and the outer cap member, one of the inner cap member or outer cap member having a substantially cylindrical side wall and the other of the inner cap member or outer cap member having faceted side walls, thereby forming at least three channels between the inner cap member and the outer cap member to facilitate the flow of the sealant material towards the base.

The at least three channels form a path along which the sealant may flow more freely as compared to the gap provided between the inner and outer cap members. Again, this is due to the reduced effect of friction of the sealant with the walls, thanks to the reduced sealant to wall contact for a given cross-sectional area of sealant flow.

The cap may further comprise at least three locating features on the inner surface of the inner cap member.

In a preferred embodiment of either aspect of the present invention the outer cap member has a substantially cylindrical side wall and the base of the outer cap member forms a flange extending outwardly from the inner cap member at a point which is set back from the edge of the base of the inner cap member so as to define a pocket between the flange and the base.

The cap members may be substantially dome-shaped. This arrangement both minimizes stress concentrations and assists in the flow of sealant towards the structure.

Alternatively the cap members may be substantially top-hat shaped. This arrangement may facilitate storage of the cap in an inverted position.

Alternatively the outer surface of the inner cap member and the inner surface of the outer cap member may be substantially dome-shaped, whilst the inner surface of the inner cap member and/or the outer surface of the outer cap member may have a shape which is not dome-shaped, e.g. top-hat shaped.

The cap members may be made of plastics material. The plastics material may be polyetherimide (PEI), for example. Plastic materials are generally cheap, light and easy to form whilst having the required resilience for the application.

The sealant material may be a material such as a two-part epoxy which is normally used in applications where its primary (or sole) purpose is to act as an adhesive.

Alternatively the sealant material may be a material such as poly-sulphide or silicone rubber which is normally used in applications where its primary (or sole) purpose is to act as a sealant. In the latter case the sealant material is typically an elastomer.

A yet further aspect of the invention provides a method of installing a cap to form a sealed cavity around one end of a fastener, the fastener passing through a structure, the cap comprising an inner cap member with a base terminating at an edge which surrounds an opening into a central cavity; an outer cap member which fits over the inner cap member and has a base; and a sealant material between the inner cap member and the outer cap member, wherein either: the inner cap member has side walls with a substantially uniform wall thickness and a plurality of channels formed in an outer surface of the inner cap member and a plurality of corresponding ridges formed in an inner surface of the inner cap member, the channels and the ridges extending longitudinally along a substantial portion of the inner cap member; or the outer cap member has side walls with a substantially uniform wall thickness and a plurality of channels formed in an inner surface of the outer cap member and a corresponding plurality of ridges formed in an outer surface of the outer cap member, the channels and the ridges extending longitudinally along a substantial portion of the outer cap member, said method comprising the steps of: (a) fitting the cap over one end of the fastener so that the end of the fastener is enclosed by the inner cap member and a plurality of channels are defined between the inner and outer cap members; (b) pushing the outer cap member towards the structure so that the sealant material flows substantially via the channels towards the structure so as to form a bead of sealant around the base of the cap; and (c) adhering the cap to the structure with the sealant material.

A yet further aspect of the invention provides a method of installing a cap to form a sealed cavity around one end of a fastener, the fastener passing through a structure, the cap comprising an inner cap member; an outer cap member which fits over the inner cap member; and a sealant material between the inner cap member and the outer cap member, one of the inner or outer cap member having a substantially cylindrical side wall and the other of the inner and outer cap member having faceted side walls, thereby forming at least three channels between the inner cap member and the outer cap member, said method comprising the steps of: (a) fitting the cap over one end of the fastener so that the end of the fastener is enclosed by the inner cap member and at least three channels are defined between the inner and outer cap members; (b) pushing the outer cap member towards the structure so that the sealant material flows substantially via the channels towards the structure so as to form a bead of sealant around the base of the cap; and (c) adhering the cap to the structure with the sealant material.

In the methods, inner cap can be fully installed on the fastener prior to installation of the outer cap over the inner cap. Alternatively the inner cap may be partially nested within the outer cap so that the cap is partially engaged and the sealant material moves partially along the channels prior to installation over the fastener. The sealant material may be disposed inside the outer cap prior to installation over the fastener. Alternatively, the sealant material may be disposed over the outer surface of the inner cap prior to installation of the outer cap over the inner cap.

BRIEF DESCRIPTION OF THE DRAWINGS

Embodiments of the invention will now be described with reference to the accompanying drawings, in which.

DETAILED DESCRIPTION OF EMBODIMENT(S)

Figure 2:
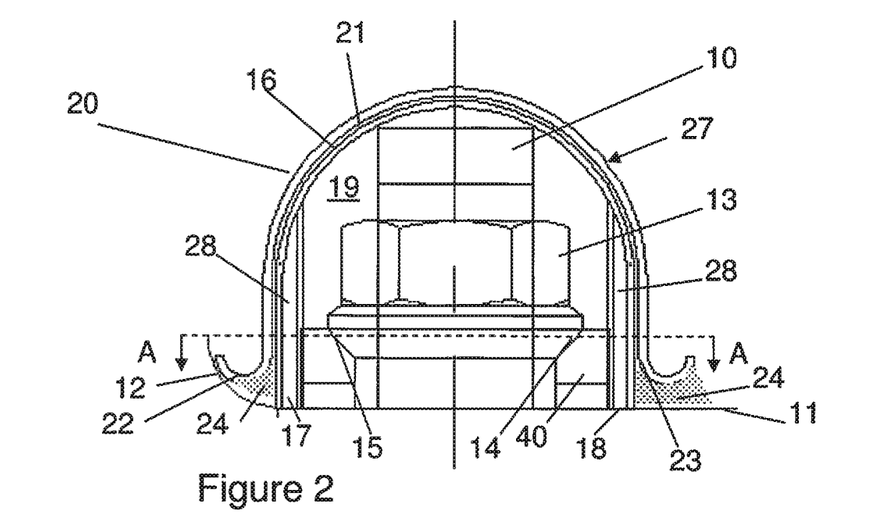
FIG. 2 is a side section view of a fastener assembly and spark containment cap according to a first embodiment of the invention.

FIG. 2 is a side section view showing a metal bolt 10 passing through a composite panel 11. The panel has a raised feature 12 on one side, which may be for example fillets, ribs or spar caps. An internally threaded metal nut 13 is screwed onto the bolt 10 and has a convex spherical surface 14 which engages a concave spherical surface 15 of a washer 40, The spherical nut and washer enable the fastener to be securely fixed to the panel and permits angular misalignment if the bolt shank is not perpendicular to the panel.

A spark containment cap is fitted over the fastener. The cap has a two-part construction with an outer cap 20 fit onto an inner cap 16 so that the inner cap 16 is nested within the outer cap 20. The caps 16, 20 have a domed shaped as indicated at 27 which reduces exposure to damage (for instance by being kicked by the foot of an installer) and minimises stress concentration. The caps 16, 20 are formed from a polymer such as polyetherimide ULTEM 2400. The inner cap 16 has a base 17 terminating at an edge 18 which surrounds an opening into a central cavity 19 which contains the nut 13, bolt 10 and washer 40. The upper part of the outer cap 20 has a domed shape and is bonded to the inner cap 16 by a thin two-part epoxy interfay adhesive layer 21. The interfay adhesive layer 21 between the inner and outer caps creates a bonded double layer with enhanced flexibility and strength.

The lower part of the outer cap 20 has a flared base (or skirt) 22 which forms an annular flange extending outwardly from the inner cap 16. The point 23 where the flange 22 begins to extend outwardly from the cap 16 is set back vertically from the edge 18 of the base 17. An annular sealant pocket 24 between the flange 22 and the base 17 is filled with the same two-part epoxy sealant as the interfay layer 21. The sealant in the sealant pocket 24 bonds the caps 16, 20 to the panel 11 and the sealed main cavity 19 contains any sparking, plasma or out-gassing caused by a lightning strike. The cap may be immersed in fuel, in which case the sealant also prevents the ingress of fuel into the main cavity 19.

Figure 3:
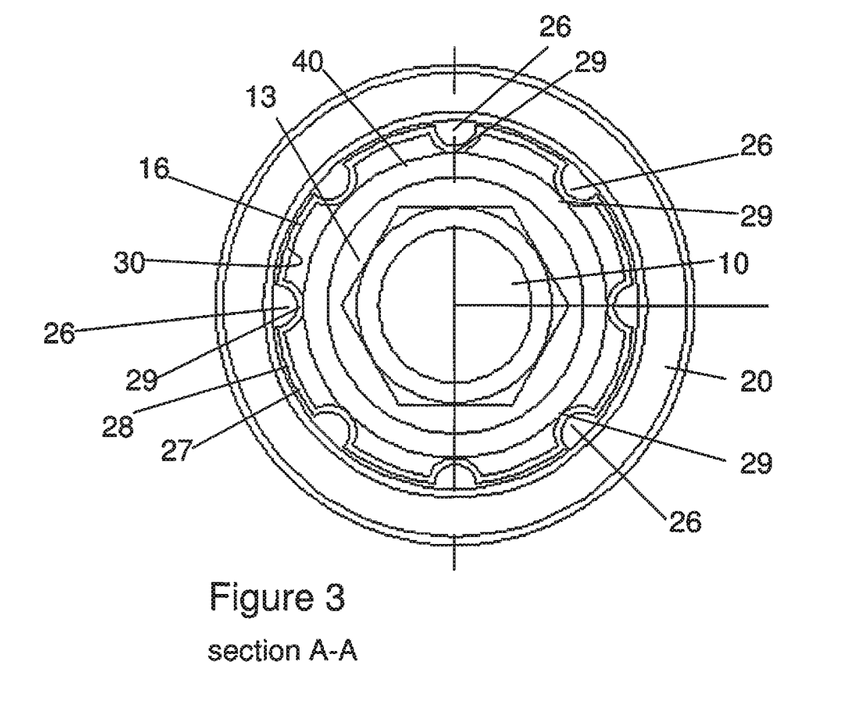
FIG. 3 is a cross-sectional view of the assembly of FIG. 2 along A-A.

As best shown in the section view A-A of FIG. 3 the inner cap member 16 has a side wall 28 with a substantially uniform wall thickness around the entire circumference of the inner cap member 16. The side walls 28 are generally cylindrical but have eight identical and evenly distributed channels 26 formed in an outer surface 27 thereof and eight corresponding ridges 29 formed in an inner surface 30 thereof. The cross section of the channels 26 when viewed in the longitudinal direction is substantially scallop shaped.

The channels 26 and ridges 29 extend longitudinally towards the base 18 of the inner cap member 16. Each channel and ridge pair is separated from their adjacent channel and ridge pairs by regions where the inner and outer surfaces of the inner cap member 20 have constant diameter. The outer surface of the side wall 28 inner cap member 16 intermediate the channels 26 is sized to form a clearance fit with the inner surface of the side wall of the outer cap member 20. This clearance fit centralizes and orientates the outer cap.

The eight ridges 29 of the inner cap member 16 engage the washer 40 at eight single point of contact locations and allow the inner cap member 16 to flex to accommodate expansion around the washer.

By locating the cap on the washer 40, the cap can be installed against the surface of the structure 11 even if the bolt 10 is not perpendicular to the surface, i.e. the surface is a sloping surface.

Note that the caps are principally bonded together by the domed interfay adhesive layer 21 which is located outside the pocket 24, but they are also bonded together by the sealant within the pocket 24.

A method of installing the spark containment cap of FIGS. 2 and 3 will now be described. The caps 16, 20 are supplied as a kit of parts. A metered quantity of two-part epoxy sealant is provided between the inner and outer caps. As an alternative to the two-part epoxy sealant a poly-sulphide sealant may used, optionally in a frozen state. The inner cap 16 is pushed onto the fastener assembly with the ridges 29 acting as location lugs to engage the washer 40 as a slight interference fit and the edge 18 of the cap engaging the panel 11. The interference fit prevents the inner cap from falling off under the action of gravity if the panel 11 is downward facing.

Next, the outer cap 20 is pushed over the inner cap 16. The two-part epoxy sealant is squeezed between the outer and inner caps and flows predominantly via the channels 26 down to the base of the cap, completely filling the pocket 24 without entering the central cavity. The channels form a path along which the sealant may flow more freely as compared to the nominal gap provided between the side walls of the inner and outer caps. This is due to the reduced effect of friction of the sealant with the walls, thanks to the reduced sealant to wall contact for a given cross-sectional area of sealant flow.

To improve the flow of sealant between the inner and outer caps the number of channels (and corresponding ridges) may be increased. For example, instead of the eight channels shown in the embodiment of FIGS. 2 and 3 the number of channels may be increased to twelve, or indeed any other suitable number. The increased number of channels may aid distribution of the sealant at the bond line. Of course, the greater the number of channels the greater the sealant to wall contact for a given cross-sectional area of sealant flow, and so an optimal number of channels for a particular channel depth can be selected for a given installation force. The ratio of the channel size to the diameter of the outer cap cavity can be tailored to produce a mechanical advantage, i.e. the same amount of sealant can be dispensed over a longer stroke length during as the outer cap is sleeved over the inner cap.

The channel width may flare outwardly towards the base. The flares may join to form a substantially annular aperture between the inner and outer cap members adjacent their respective bases. This arrangement further supports sealant flow and even distribution of sealant at the bond line with the structure.

Figure 4:
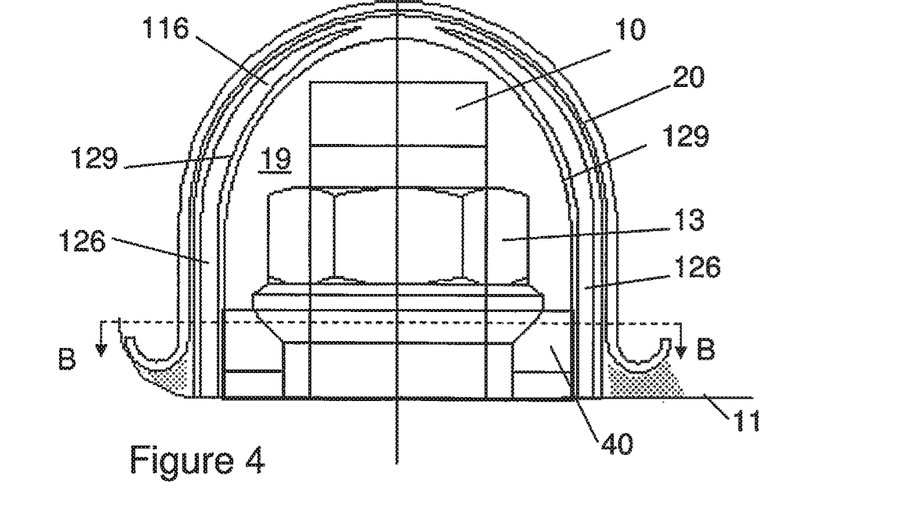
FIG. 4 is a side section view of a fastener assembly and spark containment cap according to a second embodiment of the invention.
Figure 5:
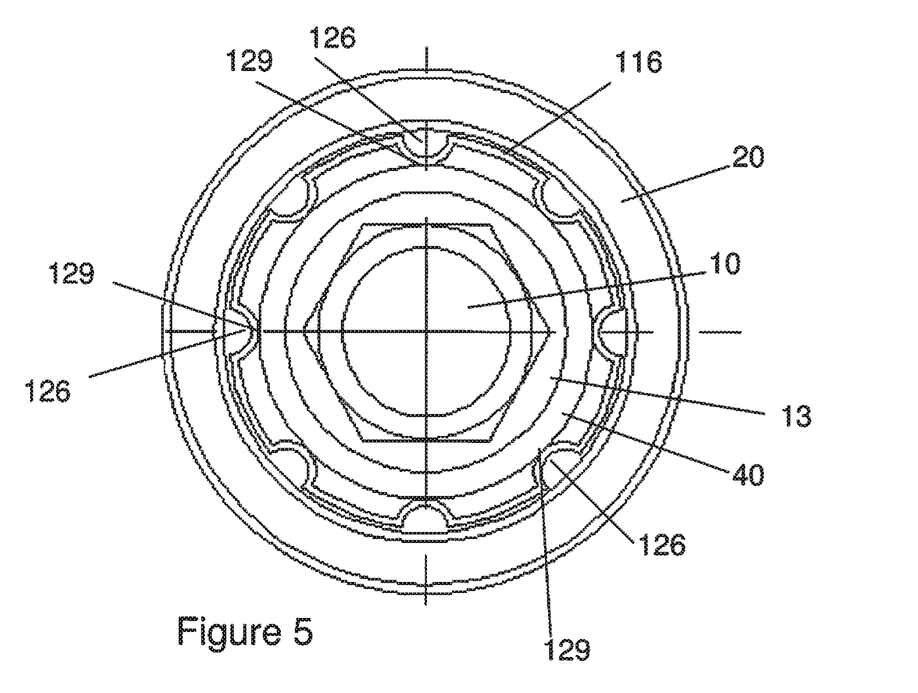
FIG. 5 is a cross-sectional view of the assembly of FIG. 4 along B-B.

FIGS. 4 and 5 illustrate a second embodiment of the spark containment cap. Like reference numerals have been used to denote like parts with the first embodiment of FIGS. 2 and 3 and only the differences will be described in the following. The second embodiment differs only in that the side wall of the inner cap 116 has channels 126 and corresponding ridges 129 which extend to the top of the inner cap, and the depth of the channels diminishes towards the top of the cap. The channels 126 emanate from a common point at the top of the cap. This may decrease the installation force and help ensure even supply of sealant along each channel. Installation of the spark containment cap of the second embodiment can be effected in an identical manner to that described above with reference to the first embodiment.

Figure 6:
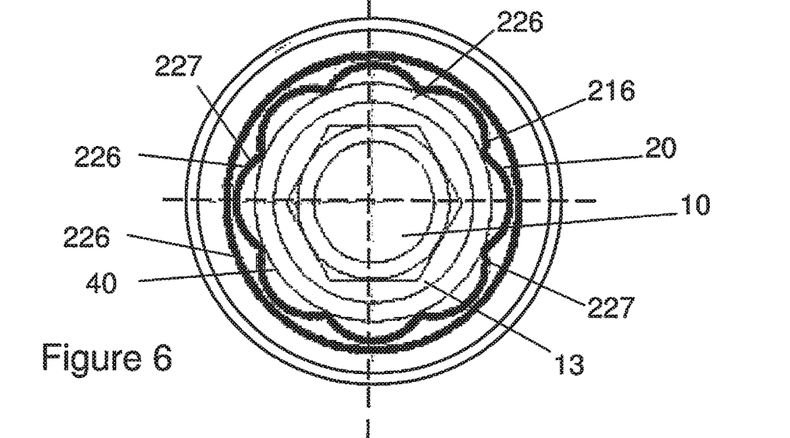
FIG. 6 is a cross-sectional view of a fastener assembly and spark containment cap according to a third embodiment of the invention.

FIG. 6 illustrates a third embodiment of the spark containment cap. Like reference numerals have been used to denote like parts with the first embodiment of FIGS. 2 and 3 and only the differences will be described in the following. The third embodiment differs only in that the side wall of the inner cap 216 has channels and ridges 226, 227 formed continuously around the circumference of the inner cap, and not interspersed between regions where the inner and outer surfaces of the inner cap member have constant diameter.

The channels 226 in the outer surface of the inner cap are generally v-shaped so forming a cusp at the base of each channel, which defines the ridge 227 of the reverse (inner) surface of the inner cap. The adjacent channels 226 meet at a crest with a substantially continuous curvature defining the maximum outer diameter of the inner cap. The crests form a clearance fit with the inner surface of the outer cap. Installation of the spark containment cap of the third embodiment can be effected in an identical manner to that described above with reference to the first embodiment.

In another alternate embodiment (not shown), the channels and ridges are continuous around the circumference of the inner cap member and the crest of one channel meets the cusp of the adjacent channel, so as to approximate a sinusoidal wave around the circumference of the inner cap.

Figure 7:
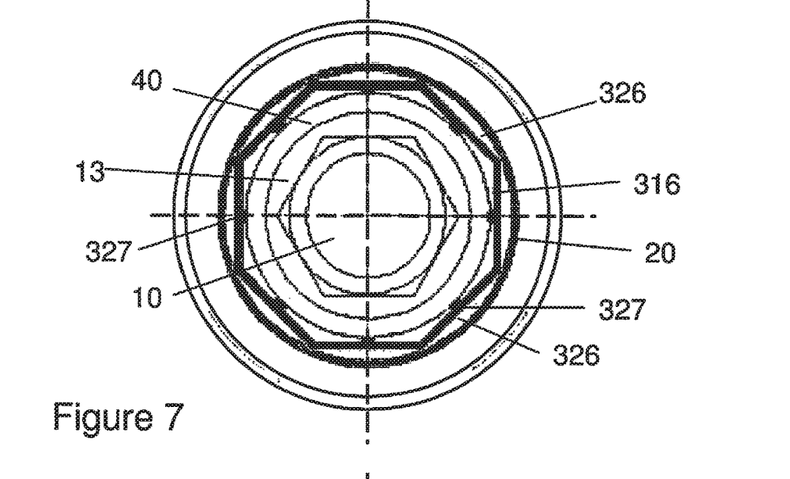
FIG. 7 is a cross-sectional view of a fastener assembly and spark containment cap according to a fourth embodiment of the invention.

FIG. 7 illustrates a fourth embodiment of the spark containment cap. Like reference numerals have been used to denote like parts with the first embodiment of FIGS. 2 and 3 and only the differences will be described in the following. The fourth embodiment differs in that the inner cap 316 has a faceted side wall, whilst the outer cap 20 remains as before with a cylindrical side wall. The inner cap 316 may have any number of facets three or greater, and in the particular example shown in FIG. 7 has an octagonal section with eight facets. When the inner cap is nested within the outer cap eight channels 326 are formed between the outer surface of the inner cap and the inner surface of the outer cap. The channels function in a substantially identical manner to that described above to facilitate the flow of the sealant material towards the base of the cap.

A plurality of locating lugs or ridges 327 extend inwardly from the mid-point of each facet of the inner side wall of the inner cap. These engage the washer 40 as a slight interference fit to prevent the inner cap from falling off under the action of gravity if installed upside down. Installation of the spark containment cap of the fourth embodiment can be effected in an identical manner to that described above with reference to the first embodiment.

Figure 8:
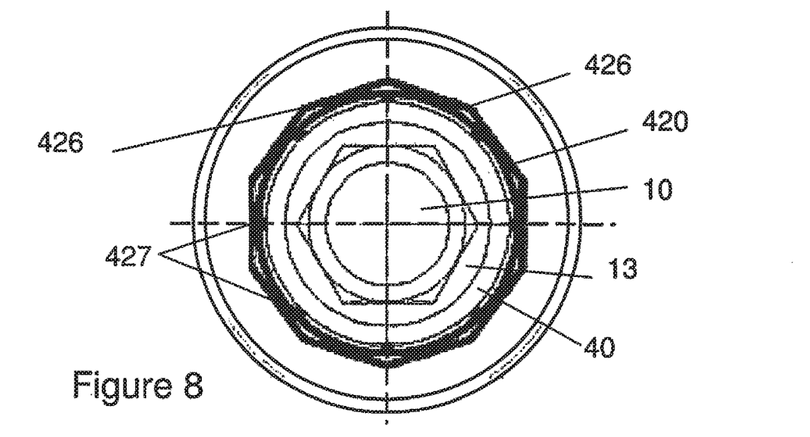
FIG. 8 is a cross-sectional view of a fastener assembly and spark containment cap according to a fifth embodiment of the invention.

FIG. 8 illustrates a fifth embodiment of the spark containment cap. Like reference numerals have been used to denote like parts with the first embodiment of FIGS. 2 and 3 and only the differences will be described in the following. The fourth embodiment differs in that the inner cap 416 has a substantially cylindrical side wall and the outer cap 420 has a faceted side wall. The outer cap 420 may have any number of facets three or greater, and in the particular example shown in FIG. 8 has an octagonal section with eight facets. When the inner cap is nested within the outer cap eight channels 426 are formed between the outer surface of the inner cap and the inner surface of the outer cap. The channels function in a substantially identical manner to that described above to facilitate the flow of the sealant material towards the base of the cap.

The faceted side wall of the outer cap may be formed as any regular polygon, or alternatively may be formed as an irregular polygon, or a star-shaped polygon.

A plurality of locating lugs or ridges 427 are formed extending inwardly at regularly spaced locations around the inner surface of the inner cap. In the particular example shown in FIG. 8 there are 8 locating lugs 427 but any number of lugs three or greater may be provided. These engage the washer 40 as a slight interference fit to prevent the inner cap from falling off under the action of gravity if installed upside down. Installation of the spark containment cap of the fifth embodiment can be effected in an identical manner to that described above with reference to the first embodiment.

Any features of the first to fifth embodiments described above may be appropriately combined. For example, flaring of the channels adjacent the base of the cap to aid sealant distribution at the bond line may be incorporated into any of the embodiments.

Although the invention has been described above with reference to one or more preferred embodiments, it will be appreciated that various changes or modifications may be made without departing from the scope of the invention as defined in the appended claims.

The invention claimed is:

1. A cap for forming a sealed cavity around one end of a fastener, the cap comprising an inner cap member with a base terminating at an edge which surrounds an opening into a central cavity; an outer cap member which fits over the inner cap member and has a base; wherein either: the inner cap member has a number of channels formed in an outer surface of the inner cap member and a number of corresponding ridges formed in an inner surface of the inner cap member, the number of channels being the same as the number of corresponding ridges; or the outer cap member has a number of channels formed in an inner surface of the outer cap member and a number of corresponding ridges formed in an outer surface of the outer cap member, the number of channels being the same as the number of corresponding ridges.

2. A cap according to claim 1, wherein either: the channels and the ridges extend longitudinally along a substantial portion of the inner cap member; or the channels and the ridges extend longitudinally along a substantial portion of the outer cap member.

3. A cap according to claim 1, wherein the channel depth diminishes towards the top of the cap.

4. A cap according to claim 1, wherein the channel width flares outwardly towards the base.

5. A cap according to claim 1, wherein the base of the outer cap member forms a flange extending outwardly from the inner cap member at a point which is set back from the edge of the base of the inner cap member so as to define a pocket between the flange and the base of the inner cap member.

6. A cap according to claim 1, wherein the cap members are substantially dome-shaped.

7. A cap according to claim 1, wherein either: the inner cap member has a corrugated shape forming the channels and corresponding ridges; or the outer cap member has a corrugated shape forming channels and corresponding ridges.

8. A cap according to claim 1, wherein the number of channels is eight or more.

9. A cap according to claim 1, further comprising a sealant material between the inner cap member and the outer cap member.

10. A cap according to claim 1 wherein the channels and ridges are formed continuously around the circumference of the inner cap.

11. A method of installing a cap to form a sealed cavity around one end of a fastener, the fastener passing through a structure, the cap comprising an inner cap member with a base terminating at an edge which surrounds an opening into a central cavity; an outer cap member which fits over the inner cap member and has a base; and a sealant material between the inner cap member and the outer cap member, wherein either: the inner cap member has a number of channels formed in an outer surface of the inner cap member and a number of corresponding ridges formed in an inner surface of the inner cap member, the number of channels being the same as the number of corresponding ridges, the channels and the ridges extending longitudinally along a substantial portion of the inner cap member; or the outer cap member has a number of channels formed in an inner surface of the outer cap member and a number of corresponding ridges formed in an outer surface of the outer cap member, the number of channels being the same as the number of corresponding ridges, the channels and the ridges extending longitudinally along a substantial portion of the outer cap member, said method comprising the steps of: (a) fitting the cap over one end of the fastener so that the end of the fastener is enclosed by the inner cap member and a plurality of channels are defined between the inner and outer cap members; (b) pushing the outer cap member towards the structure so that the sealant material flows substantially via the channels towards the structure so as to form a bead of sealant around the base of the cap; and (c) adhering the cap to the structure with the sealant material.

12. A method according to claim 11, wherein either: the channels and the ridges extend longitudinally along a substantial portion of the inner cap member; or the channels and the ridges extend longitudinally along a substantial portion of the outer cap member.

13. A method according to claim 11, wherein either: the inner cap member has a corrugated shape forming the channels and corresponding ridges; or the outer cap member has a corrugated shape forming the channels and corresponding ridges.

14. A cap for forming a sealed cavity around one end of a fastener, the cap comprising an inner cap member with a base terminating at an edge which surrounds an opening into a central cavity; an outer cap member which fits over the inner cap member and has a base; wherein either: the inner cap member has a corrugated shape forming a plurality of channels in an outer surface of the inner cap member and a plurality of corresponding ridges in an inner surface of the inner cap member; or the outer cap member has a corrugated shape forming a plurality of channels in an inner surface of the outer cap member and a corresponding plurality of ridges in an outer surface of the outer cap member.

15. A cap according to claim 14, wherein either: the channels and the ridges extend longitudinally along a substantial portion of the inner cap member; or the channels and the ridges extend longitudinally along a substantial portion of the outer cap member.

16. A cap according to claim 14, wherein the longitudinal channels emanate from a common point at the top of the cap.

17. A cap according to claim 14, wherein the base of the outer cap member forms a flange extending outwardly from the inner cap member at a point which is set back from the edge of the base of the inner cap member so as to define a pocket between the flange and the base of the inner cap member.

18. A cap according to claim 14, further comprising a sealant material between inner cap member and the outer cap member.

19. A method of installing a cap to form a sealed cavity around one end of a fastener, the fastener passing through a structure, the cap comprising an inner cap member with a base terminating at an edge which surrounds an opening into a central cavity; an outer cap member which fits over the inner cap member and has a base; and a sealant material between the inner cap member and the outer cap member, wherein either: the inner cap member has a corrugated shape forming a plurality of channels in an outer surface of the inner cap member and a plurality of corresponding ridges in an inner surface of the inner cap member; or the outer cap member has a corrugated shape forming a plurality of channels formed in an inner surface of the outer cap member and a corresponding plurality of ridges in an outer surface of the outer cap member, said method comprising the steps of: (a) fitting the cap over one end of the fastener so that the end of the fastener is enclosed by the inner cap member and a plurality of channels are defined between the inner and outer cap members; (b) pushing the outer cap member towards the structure so that the sealant material flows substantially via the channels towards the structure so as to form a bead of sealant around the base of the cap; and (c) adhering the cap to the structure with the sealant material.

20. A method according to claim 19, wherein either: the channels and the ridges extend longitudinally along a substantial portion of the inner cap member; or the channels and the ridges extend longitudinally along a substantial portion of the outer cap member.

* * * * *